Jan. 12, 1932.   H. A. HICKS ET AL   1,840,900
AIRPLANE LANDING GEAR
Filed May 26, 1930   2 Sheets-Sheet 1

INVENTORS.
H. A. Hicks.
H. L. Van Alstyne.
BY
ATTORNEY.

Jan. 12, 1932.   H. A. HICKS ET AL   1,840,900
AIRPLANE LANDING GEAR
Filed May 26, 1930    2 Sheets-Sheet 2
*Fig.3*
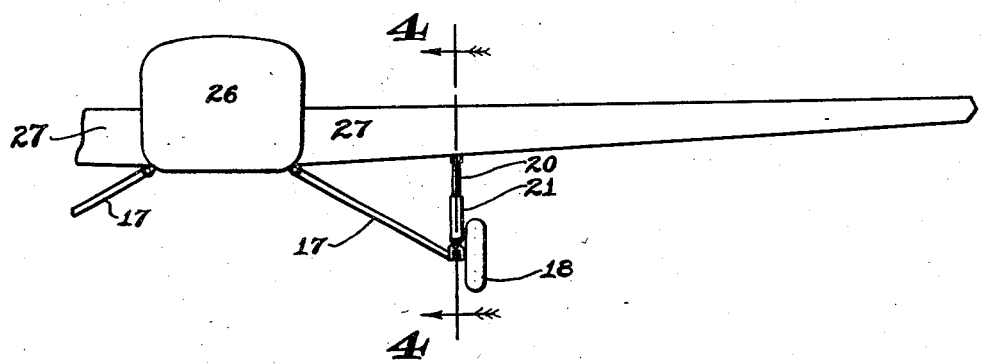
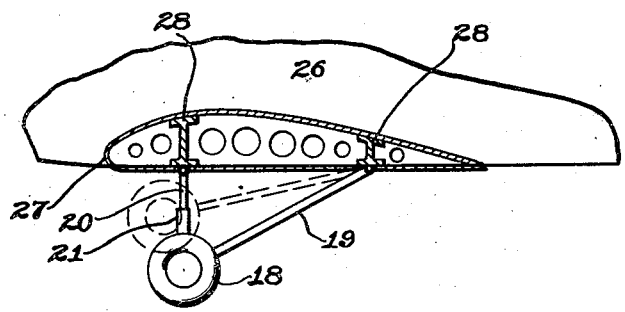
*Fig.4*
INVENTOR.
H. A. Hicks
BY H. L. Van Alstyne.
E. L. Davis
ATTORNEY.

Patented Jan. 12, 1932

1,840,900

UNITED STATES PATENT OFFICE

HAROLD A. HICKS, OF DETROIT, MICHIGAN, AND HAROLD L. VAN ALSTYNE, OF WATERTOWN, NEW YORK, ASSIGNORS TO FORD MOTOR COMPANY, OF DEARBORN, MICHIGAN, A CORPORATION OF DELAWARE

AIRPLANE LANDING GEAR

Application filed May 26, 1930. Serial No. 455,558.

The object of our invention is to provide an airplane landing gear of simple, durable, and inexpensive construction.

A further object of our invention is to provide a landing gear especially adapted for use in connection with the larger types of airplanes wherein the landing gear must be capable of absorbing extremely large impact loads. Landing gears for such planes must invariably be provided with shock absorbing means for supporting the landing wheels, which shock absorbers should allow the wheels a vertical movement of several feet. The general rule is that a longer shock absorber travel reduces the impact stresses in the landing gear so that a comparatively light weight landing gear results when such travel is provided. In this structure an exceptionally long vertical movement is provided for the landing wheels so that the very light weight structure which supports these wheels has an ample factor of safety.

Still a further object of our invention is to provide a landing gear in which the tread of the landing wheels is constant. It is ordinary practice in airplane designing to rotatably mount the landing wheels on the outer ends of a pair of axles, the inner ends being pivoted to the fuselage. Since the bottom of the fuselage must be placed a considerable distance above the axes of the wheels to provide clearance, the axles necessarily extend diagonally downward from the fuselage to the wheels. The disadvantage of this structure arises for the reason that the wheels swing in arcuate paths around the lower corners of the fuselage, which causes them to spread as greater loads are placed upon them. This spreading action increases the tread of the wheels on transport planes as much as three or four feet which causes great damage to the tires and which is liable to rupture the wheels or force the tires completely off the wheels. For this reason the vertical movement of such wheels have been limited so that a heavier landing gear is required.

In our improved structure the wheels swing in arcuate paths defining vertical planes parallel to the fuselage and to each other so that the tread of the wheels is constant under all conditions. We are thus able to provide an increased vertical movement for the wheels to thereby reduce the stresses on the landing gear structure.

Still a further object of our invention is to provide a landing gear having a shock absorbing member extending from the under side of the airplane wing directly to the landing wheel. With this construction the greater portion of the impact loads are transferred directly to the wing structure so that the landing gear is relieved of these stresses. The wings of the high wing monoplane type planes are internally braced by longitudinal spars which are designed to support the load of the fuselage. As this wing forms the greater mass of the plane it is advantageous to support the weight thereof directly on the landing wheels without transferring these stresses through the fuselage. With this construction the fuselage can be made lighter to better the performance of the plane.

Still a further object of our invention is to provide a landing gear which is particularly suited to resist the stress when brakes are applied to the landing wheels. In our improved structure the brake anchor plates are loosely mounted on the axles and a pair of tension rods are fastened to these plates at points spaced from their axes, the other ends of these rods being fastened to the fulcrums around which the wheels pivot. Thus, the braking torque is resisted by the tension rods, there being no torsional loads on the axles as in the conventional landing gears.

With these and other objects in view our invention consists in the arrangement, construction, and combination of the various parts of our improved device, as described in the specification, claimed in our claims, and illustrated in the accompanying drawings, in which:

Figure 3 shows an alternate structure wherein our landing gear is mounted on a low wing monoplane, and Figure 4 shows a sectional view taken on the line 4—4 of Figure 3.

Figure 1:
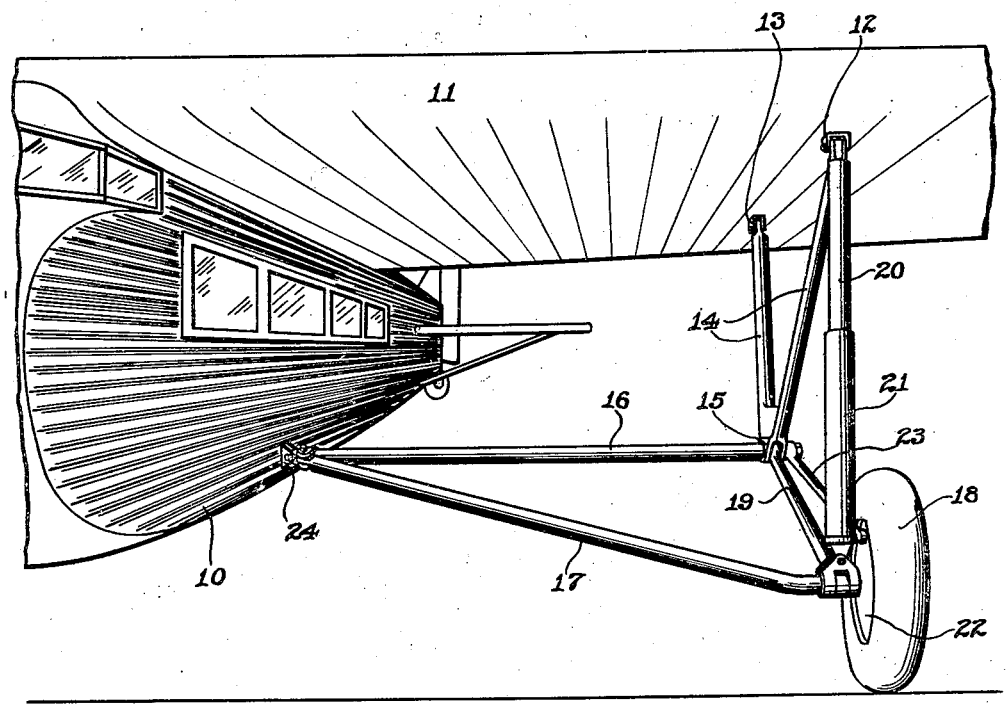
Figure 1 shows a perspective view showing the front elevation of an airplane having our improved landing gear installed thereon.
Figure 2:
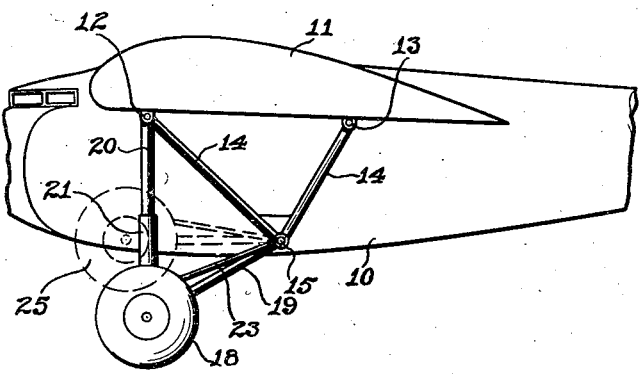
Figure 2 shows a side elevation of the landing gear illustrated in Figure 1.

Referring to Figures 1 and 2 of the accompanying drawings, we have provided a transport airplane having a fuselage 10 of the ordinary cabin type. This fuselage is fastened beneath the center portion of a single wing 11 to form what is known as a high wing monoplane construction. Secured to the under side of the wing 11 and spaced a considerable distance from each side of the fuselage 10, we have provided a pair of front clevises 12 and rear clevises 13 which are fastened to the front and rear main longitudinal spars of the wing. A V shaped brace 14 is suspended beneath the wing on each side of the fuselage, the upper ends of which are secured to the clevises 12 and 13. The lower ends of the members comprising the brace 14 are, of course, joined together and form a fulcrum 15 around which the landing wheels pivot.

Fittings 24 are secured to the lower portion of each side of the fuselage, which fittings are in substantial alignment with the fulcrums 15. A pair of struts 16 may thus be fastened between the fittings 24 and the fulcrums 15, which struts will extend outwardly from the fuselage and support the fulcrums 15 against lateral movement. It will be noted that the struts 16 are substantially perpendicular to the fuselage 10 and that they extend substantially parallel to the wing 11.

We have provided a pair of axles 17 extending diagonally forwardly and downwardly from the fittings 24. Each axle 17 has one end hinged to the strut 16 adjacent to the fitting 24 and the other end extends outwardly and downwardly in a diagonal direction to a position forwardly of the strut 16. The outer end of each axle is provided with a landing wheel 18 rotatably mounted thereon and a pair of tubular beams 19, pivoted to the fulcrums 15, extend forwardly therefrom and connects with the axles 17 adjacent to the wheels 18. Thus, the axles 17, the wheels 18, and the beams 19 may pivot around the struts 16. This action is shown in Figure 2 where the dotted lines 25 illustrate the upper position of the wheel.

It will be seen that the struts 16 being perpendicular to the fuselage and aligned with each other guide the wheels 18 so that the tread of the wheels remain the same during the full swinging movement of the wheels.

An extensible shock absorber, consisting of a pair of concentric tube members 20 and 21, extends between each of the clevises 12 and the axles 17 adjacent to the wheels 18. These shock absorbers are arranged to resiliently support the weight of the plane on an air cushion but, if desired, other types of shock absorbers may be used in connection with our landing gear. When the axles 17 and the wheels 18 tend to pivot upwardly around the struts 16 the shock absorber members are compressed so as to absorb the impact of this movement. With the type of pneumatic shock absorber shown in the drawings, a long vertical travel for the wheels is easily provided so that the plane may be exceptionally well cushioned.

The axles 17 are provided with brake anchor plates 22 loosely mounted thereon upon which brake shoes adapted to co-act with a brake drum secured to the wheels 18 are anchored in the ordinary manner. In contrast to the conventional structure wherein such anchor plates are secured to the ends of the axles 17, these axles being of sufficient dimensions to resist the brake torque action, we fasten a tension rod 23 to each of the brake anchor plates just above the axles 17 and secure the other ends of these rods to the fulcrums 15. Thus, the anchor plates 22, axles 17, beams 19, and tension rods 23 swing as a unit around the axes of the struts 16, there being no relative movement of the anchor plates around the axles 17. Application of the brakes when the plane is travelling in a forward direction will tend to elongate the tension rods 23 and compress the beams 19. The fulcrums 15 will also be stressed rearwardly which will be resisted by tension and compression in the front and rear members, respectively, of the braces 14. It will be noted that there are no torsional or bending loads applied to any of the members of the device so that relatively small sections can be used.

Among the many advantages arising from the use of our improved device it may be well to mention that an exceptionally strong, sturdy, and light weight landing gear results from this construction and one in which the shock absorbing travel of the wheels are exceptionally long. A further advantage results because the tread of the landing wheels remain uniform throughout the various positions of vertical travel. Still a further advantage results because the brake torque is taken entirely by means independent of the wheel axle which means operates in tension and compression rather than under a torsional load.

Referring to Figures 3 and 4, a low wing monoplane is shown having a fuselage 26 and wings 27 extending outwardly therefrom. The axles 17 are pivoted to the lower corners of the fuselage at the intersection of a rear wing spar 28 and extend downwardly and forwardly to positions where the wheels 18 are secured to their outer free ends. The beams 19 instead of being pivotally mounted on the braces 14 are pivotally secured directly to the lower faces of the rear wing spar 28. Thus, the axles 17, wheels 18 and beams 19 may pivot around the aligned centers adjacent to the rear wing spar.

The shock absorber elements extend between the free ends of the axles 17 and the forward wing spar 29 so that this spar absorbs the impact loads on the landing gear. If desired, a brake tension rod may be used with this device, as shown in Figures 1 and 2 whereby the rear wing spar will then absorb the braking loads.

Some changes may be made in the arrangement, construction and combination of the various parts of our improved device without departing from the spirit of our invention, and it is our intention to cover by our claims such changes as may reasonably be included within the scope thereof.

We claim as our invention:

1. In an airplane construction, a fuselage having a strut extending outwardly from one side thereof, means for bracing the outer end of said strut, a beam pivotally mounted on said outer end so as to swing forwardly therearound, said beam having a landing wheel axle secured to the free end thereof upon which axle a brake anchor plate is rotatably mounted, a rod extending forwardly from the outer end of said strut and secured to the anchor plate at a point spaced vertically from the axis thereof, and a compressible shock absorber strut extending between said axle and airplane whereby landing loads on said axle will be totally resisted by compressing said shock absorber and torsional loads on said anchor plate will be totally resisted by compression and tension in said beam and tension rod so that bending stresses in said members will be eliminated.

2. In an airplane construction, a fuselage having a strut extending outwardly from one side thereof, a pair of converging braces extending downwardly from the under face of the airplane wing supporting the outer end of said strut, a beam pivotally mounted relative to said outer end, said beam having an axle secured to the free end thereof upon which a brake anchor plate is rotatably mounted, a rod extending from the outer end of said strut and secured to the anchor plate at a point above said axle, and a compressible shock absorber strut extending from said axle upwardly to the airplane wing whereby the impact loads of landing will be totally resisted by compression in said shock absorber strut and the torsional load of braking will be totally resisted by compression in either said beam or rod and tension in the beam or rod not subject to compression so that bending stresses in the shock absorber strut and beam and rod will be eliminated.

3. In an airplane construction, a fuselage having a strut extending laterally from one side thereof, a pair of converging braces extending downwardly from the under side of the airplane wing supporting the outer end of said strut, a beam pivotally mounted relative to the converging ends of said braces, said pivot being adjacent to the outer end of said strut, an axle secured to the free end of said beam upon which a brake anchor plate is mounted, a rod extending from the outer end of said strut and secured to said anchor plate at a point spaced vertically from said axle, and a compressible shock absorber strut extending from the axle to the wing of the airplane whereby impact loads of landing will be totally resisted by compression in said shock absorber strut and torsional loads of braking will be resisted by compression in either said beam or rod and tension in the beam or rod not subject to compression so that bending stresses in the shock absorber strut and beam and rod will be eliminated.

4. In an airplane construction, a fuselage having a strut extending laterally from one side thereof, a pair of converging braces extending downwardly from the under side of the airplane wing supporting the outer end of said strut, a beam pivotally mounted relative to the converging ends of said braces, said pivot being adjacent to the outer end of said strut, an axle extending from the inner end of the strut diagonally outwardly and forwardly to the free end of said beam, a brake anchor plate mounted upon said axle adjacent to said beam, a rod extending from the outer end of said strut and secured to said anchor plate at a point spaced vertically from said axle, and a compressible shock absorber strut extending from the outer end of the axle to the wing of the airplane, whereby impact loads of landing will be totally resisted by compression in said shock absorber strut and torsional loads of braking will be resisted by compression in either said beam or rod and tension in the beam or rod not subject to compression so that bending stresses in the shock absorber strut and beam and rod will be eliminated.

5. In a high wing monoplane construction, a fuselage having a strut extending laterally from one side thereof, a pair of converging braces extending downwardly from a plurality of the spars of said wing supporting the outer end of said strut, a beam pivotally mounted relative to the converging ends of said braces said pivot being adjacent to the outer end of said strut, an axle secured to the free end of said beam having a brake anchor plate mounted thereon, the inner end of said axle extending inwardly to the fuselage adjacent to said strut, a rod extending from the free end of said beam and secured to the anchor plate at a point directly above and spaced from said axle, and a compressible shock absorber strut extending between said axle and one of the wing spars whereby impact loads of landing will be resisted by compression in said shock absorber and torsional loads of braking will be resisted by compression in said beam and tension in said rod so that bending stresses in the shock absorber and beam and rod will be eliminated.

6. In an airplane construction, a fuselage having a strut extending outwardly from one side thereof, means for bracing the outer ends of said strut, a beam pivotally mounted on said outer end so as to swing forwardly therearound, said beam having a landing wheel axle secured to the free end thereof upon which a brake anchor plate is rotatably mounted, a rod extending forwardly from the outer end of said strut and rotatably secured to the anchor plate at a point spaced vertically from the axis thereof, and a compressible shock absorber strut extending between said axle and airplane whereby landing loads on said axle will be totally resisted by compressing said shock absorber and torsional loads on said anchor plate will be totally resisted by compression and tension in said beam and tension rod so that bending stresses in said members will be eliminated.

7. In an airplane construction, a fuselage having a strut extending outwardly from one side thereof, a pair of converging braces extending downwardly from the under face of the airplane wing supporting the outer end of said strut, a beam pivotally mounted on said outer end so as to swing forwardly therearound, said beam having a landing wheel axle secured to the free end thereof upon which a brake anchor plate is rotatably mounted, a rod extending forwardly from the outer end of said strut and rotatably secured to the anchor plate at a point spaced above the axis thereof, and a compressible shock absorber strut extending between said axle and airplane wing, whereby the impact loads of landing will be totally resisted by compression in said shock absorber strut and the torsional load of braking will be totally resisted by compression in said beam and tension in said rod so that bending stresses in the strut and beam and rod will be eliminated.

8. In an airplane construction, a fuselage having a strut extending outwardly from one side thereof, a beam pivotally mounted on the outer end of said strut so as to swing forwardly therearound, said beam having a landing wheel axle secured to the free end thereof upon which axle a brake anchor plate is rotatably mounted, a rod extending forwardly from the outer end of said strut secured to the anchor plate at a point spaced vertically from the axis thereof, and a compressible shock absorber strut extending between said axle and airplane whereby landing loads on the axle will be totally resisted by compressing said shock absorber and torsional loads on said anchor plate will be totally resisted by compression and tension in said beam and tension rod so that bending stresses in said members will be eliminated.

9. In an airplane construction, a fuselage having a strut extending laterally from one side thereof, a beam pivotally mounted and aligned with the outer end of said strut so as to swing forwardly therearound, said beam having a landing wheel axle secured to the free end thereof upon which axle a brake anchor plate is mounted, a rod extending forwardly from the outer end of said strut and secured to the anchor plate at a point spaced vertically from the axis thereof, and a compressible shock absorber strut extending between said axle and airplane whereby landing loads on said axle will be totally resisted by compressing said shock absorber and torsional loads on said anchor plate will be resisted by compression and tension in said beam and tension rod so that bending stresses in said members will be practically eliminated.

10. In an airplane construction, a fuselage having a strut extending laterally from one side thereof, a beam pivotally mounted on the outer end of said strut so as to swing forwardly therearound, said beam having a landing wheel axle secured to the free end thereof upon which the brake anchor plate is rotatably mounted, a rod extending forwardly from the outer end of said strut and rotatably secured to the anchor plate at a point spaced vertically from the axis thereof, and a compressible shock absorber strut extending between said axle and airplane whereby landing loads on said axle will be totally resisted by compressing said shock absorber and torsional loads on said anchor plate will be totally resisted by compression and tension in said beam and tension rod so that bending stresses in said members will be eliminated.

HAROLD A. HICKS.
HAROLD L. VAN ALSTYNE.